United States Patent
Wang

(10) Patent No.: US 11,774,062 B2
(45) Date of Patent: Oct. 3, 2023

(54) LENS WITH TOTAL REFLECTIVE INCIDENT SURFACE AND LIGHTING FIXTURE

(71) Applicants: SUZHOU OPPLE LIGHTING CO., LTD., Suzhou (CN); OPPLE LIGHTING CO., LTD., Shanghai (CN)

(72) Inventor: Wanlin Wang, Suzhou (CN)

(73) Assignees: SUZHOU OPPLE LIGHTING CO., LTD., Suzhou (CN); OPPLE LIGHTING CO., LTD., Shanghai (CN)

(*) Notice: Subject to any disclaimer, the term of this patent is extended or adjusted under 35 U.S.C. 154(b) by 0 days.

(21) Appl. No.: 17/556,059

(22) Filed: Dec. 20, 2021

(65) Prior Publication Data

US 2022/0113004 A1    Apr. 14, 2022

Related U.S. Application Data

(63) Continuation of application No. PCT/CN2020/094078, filed on Jun. 3, 2020.

(30) Foreign Application Priority Data

Jun. 19, 2019    (CN) .......................... 201920922164.8

(51) Int. Cl.
*F21V 5/04* (2006.01)
*F21V 7/00* (2006.01)
(Continued)

(52) U.S. Cl.
CPC ................ *F21V 5/04* (2013.01); *F21V 5/045* (2013.01); *F21V 7/0091* (2013.01);
(Continued)

(58) Field of Classification Search
CPC ... F21V 5/045; F21V 7/0091; G02B 19/0028; G02B 17/0868
See application file for complete search history.

(56) References Cited

U.S. PATENT DOCUMENTS 6,252,724 B1 *   6/2001  Scheer ............... G02B 19/0061
                                                362/338
7,896,524 B2 *   3/2011  Yoneda ..................... F21V 7/04
                                                362/245
(Continued)

FOREIGN PATENT DOCUMENTS

CN      101238325 A     8/2008
CN      201436456 U     4/2010
(Continued)

OTHER PUBLICATIONS

Kikuchi, Led light-emitting device, 2009, JP2009049239A, Google Patents, https://patents.google.com/patent/JP2009049239A/en?oq=jp2009049239 (Year: 2009).*

(Continued)

*Primary Examiner* — Tracie Y Green
*Assistant Examiner* — Michael Chiang
(74) *Attorney, Agent, or Firm* — Arch & Lake LLP

(57) ABSTRACT

The present disclosure relates to a lens and a lighting fixture, the lens includes a light incident portion and a light-emitting portion, the light-emitting portion includes a main light-emitting surface and an auxiliary light-emitting surface surrounding the main light-emitting surface. The main light-emitting surface and the auxiliary light-emitting surface protrude toward a side away from the light incident portion, the auxiliary light-emitting surface is a curved surface. The auxiliary light-emitting surface has a protruding height gradually decreasing in a direction away from the main light-emitting surface. The lighting fixture includes a lamp (Continued)

housing, a light-emitting assembly, and a light distribution assembly, the light distribution assembly includes the above lens.

11 Claims, 5 Drawing Sheets

(51) Int. Cl.
    *G02B 19/00*     (2006.01)
    *F21Y 115/10*     (2016.01)
    *F21V 5/00*     (2018.01)
    *F21V 17/00*     (2006.01)
    *F21V 17/02*     (2006.01)

(52) U.S. Cl.
    CPC .......... *G02B 19/0028* (2013.01); *F21V 5/007* (2013.01); *F21V 17/005* (2013.01); *F21V 17/02* (2013.01); *F21Y 2115/10* (2016.08)

(56) References Cited

U.S. PATENT DOCUMENTS

| | | | | |
|---|---|---|---|---|
| 2010/0014286 A1* | 1/2010 | Yoneda | ................... | F21V 14/00 362/245 |
| 2011/0043120 A1* | 2/2011 | Panagotacos | .......... | B64D 47/04 315/294 |
| 2013/0249375 A1* | 9/2013 | Panagotacos | ........... | F21V 13/04 313/15 |
| 2016/0116723 A1* | 4/2016 | Hukkanen | .......... | G02B 19/0061 249/117 |
| 2018/0074232 A1* | 3/2018 | Dross | .................... | F21V 7/0091 |
| 2020/0041098 A1* | 2/2020 | Dross | ................. | G02B 19/0028 |
| 2022/0003386 A1* | 1/2022 | Yan | ........................ | F21V 17/104 |

FOREIGN PATENT DOCUMENTS

| | | | | |
|---|---|---|---|---|
| CN | 105276524 A | 1/2016 | | |
| CN | 108131573 A | 6/2018 | | |
| CN | 209782513 U | 12/2019 | | |
| JP | H05281402 A | 10/1993 | | |
| JP | 2005093622 A | 4/2005 | | |
| JP | 2009049239 A | * | 3/2009 | |
| JP | 2017067831 A | 4/2017 | | |
| WO | WO-2014020475 A1 | * | 2/2014 | .............. F21V 5/045 |

OTHER PUBLICATIONS

International Search Report of PCT Application No. PCT/CN2020/094078 dated Mar. 26, 2020 with English translation, (4p).

* cited by examiner

US 11,774,062 B2

LENS WITH TOTAL REFLECTIVE INCIDENT SURFACE AND LIGHTING FIXTURE

CROSS-REFERENCE TO RELATED APPLICATIONS

This application is based upon and claims the priority of PCT patent application No. PCT/CN2020/094078 filed on Jun. 3, 2020 which claims priority to the Chinese patent application No. 201920922164.8 filed on Jun. 19, 2019, the entire contents of which are hereby incorporated by reference herein for all purposes.

TECHNICAL FIELD

The present disclosure relates to the field of lighting technology, and in particular, to a lens and a lighting fixture.

BACKGROUND

Light-emitting diode (LED) lighting fixtures have begun to be popular, and the requirements for light distribution of the LED lighting fixtures are higher and higher.

SUMMARY

The present disclosure provides a lens and lighting fixture with more focusing light beams.

The present disclosure provides a lens. The lens may include: a light incident portion and a light-emitting portion, and the light-emitting portion may include a main light-emitting surface and an auxiliary light-emitting surface surrounding the main light-emitting surface; the main light-emitting surface and the auxiliary light-emitting surface may protrude toward a side away from the light incident portion, the auxiliary light-emitting surface may be a curved surface; and the auxiliary light-emitting surface may have a protruding height gradually decreasing in a direction away from the main light-emitting. surface.

The present disclosure provides a lighting fixture. The lighting fixture may include: a lamp housing, a light-emitting assembly, and a light distribution assembly, the light distribution assembly may include a lens, the lamp housing has a lamp cavity, and the light-emitting assembly and the light distribution assembly are arranged in the lamp cavity. The lens may include: a light incident portion and a light-emitting portion, and the light-emitting portion may include a main light-emitting surface and an auxiliary light-emitting surface surrounding the main light-emitting surface; the main light-emitting surface and the auxiliary light-emitting surface may protrude toward a side away from the light incident portion, the auxiliary light-emitting surface may be a curved surface; and the auxiliary light-emitting surface may have a protruding height gradually decreasing in a direction away from the main light-emitting. surface.

It is to be understood that both the foregoing general description and the following detailed description are exemplary and explanatory only and are not restrictive of the present disclosure.

DETAILED DESCRIPTION

Figure 1:
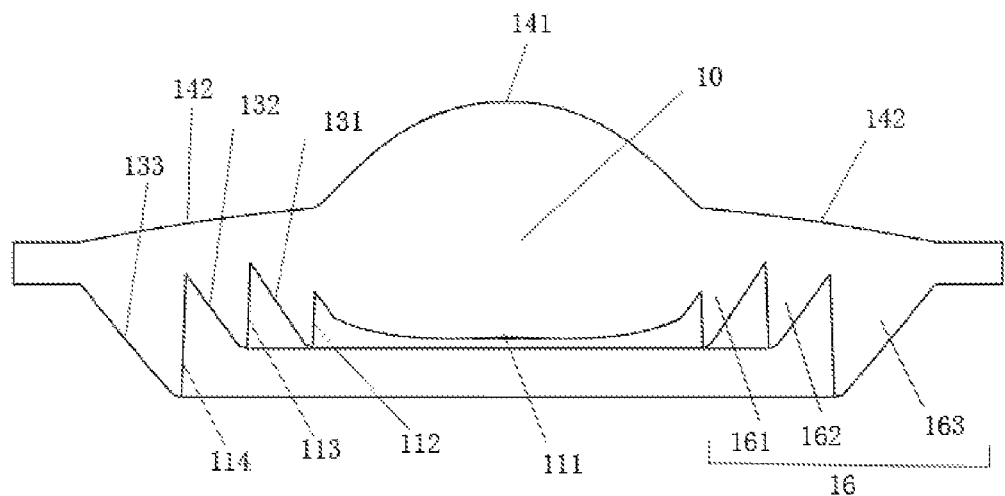
FIG. 1 is a side view of a lens according to Example 1 of the present disclosure.

In order to enable those skilled in the art to better understand the technical solutions in the present disclosure, the technical solutions in the examples of the present disclosure will be described in a clearly and fully way in connection with the drawings related to the examples of the present disclosure. Apparently, the described examples are just a part but not all of the examples of the present disclosure. Based on the described examples herein, those skilled in the art can obtain other example(s), without any inventive work, which should be within the protection scope of the present disclosure.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Names and numerals of the components in this disclosure may include:

lens 10, light incident portion 11, main light incident surface 111, first auxiliary light incident surface 112, second auxiliary light incident surface 113, third auxiliary light incident surface 114, reflective surface 13, first reflective surface 131, second reflective surface 132, third reflective surface 133, light-emitting portion 14, main light-emitting surface 141, auxiliary light-emitting surface 142, convex portion 16, first convex portion 161, second convex portion 162, third convex portion 163, light-emitting assembly 20, light plate 21, restrictive hole 211, lamp body 22, light-emitting center 221, incident light 222, emergent light 223, installation plate 30, connection hole 31, positioning groove 32, step shaft 33, lamp housing 40, lamp cavity 41, supporting portion 42, light outlet 43, transparent cover 50.

The general beam focusing technologies are Total Internal Reflection (TIR) lens, reflector or lens plus reflector. The light distribution of the TIR lens has characteristics of large thickness and high cost. The characteristic of the light distribution of the reflector is that a part of light cannot be focused through the reflective surface and is directly emitted, the secondary light spot of the light spot is relatively large and the thickness is large. The beam angle of some LED lighting fixtures may not be adjusted either.

Example 1

Figure 2:
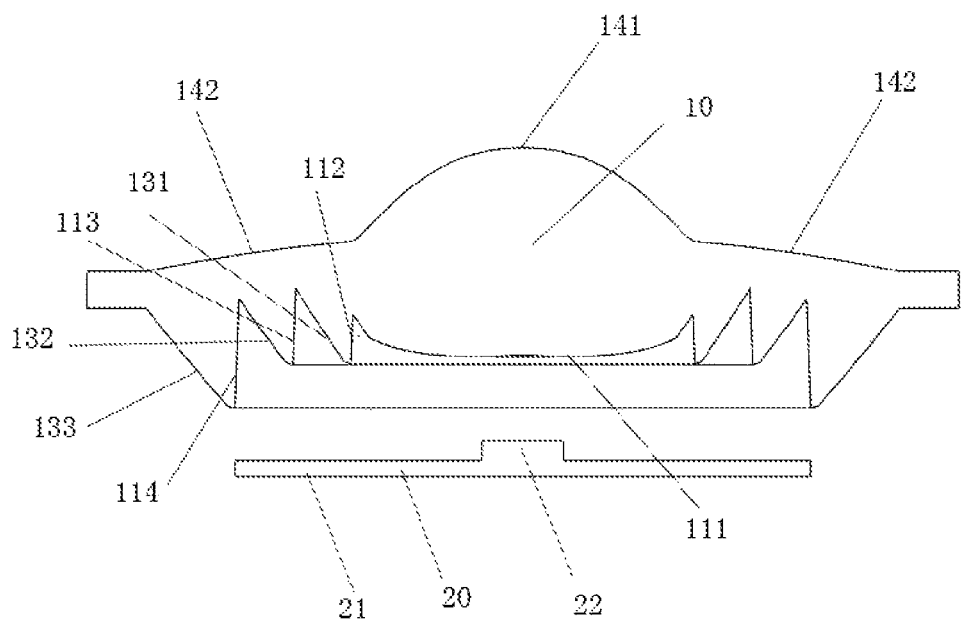
FIG. 2 is a diagram of positional relationship between the lens and a light-emitting assembly according to Example 1 of the present disclosure.
Figure 3:
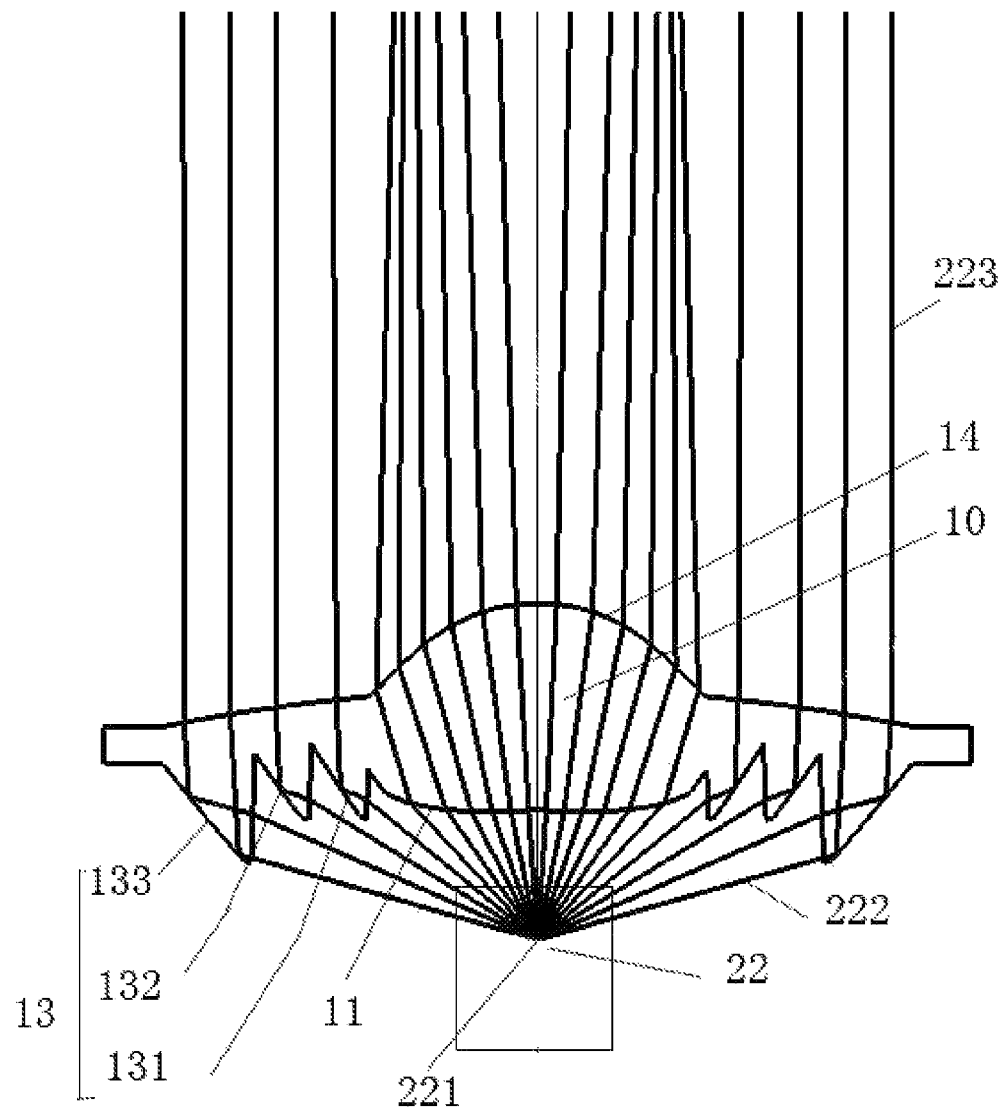
FIG. 3 is an optical path diagram of the lens according to Example 1 of the present disclosure.

As shown in FIG. 1, the example of the present disclosure discloses a lens 10, the lens 10 includes a light incident portion 11 and a light-emitting portion 14. As shown in FIG. 2 and FIG. 3, the light incident portion 11 is used to receive incident light 222 emitted by the lamp body 22 of the light-emitting assembly 20, the incident light 222 enters the light incident portion 11 and finally exits from the light-emitting portion 14 to form emergent light 223. The light-emitting portion 14 includes a main light-emitting surface 141 and an auxiliary light-emitting surface 142 surrounding the main light-emitting surface 141, and the main light-emitting surface 141 and the auxiliary light-emitting surface 142 form a continuous light-emitting surface. Preferably, the lens 10 is a collimating lens, and the emergent light 223 is a collimated light.

Figure 4:
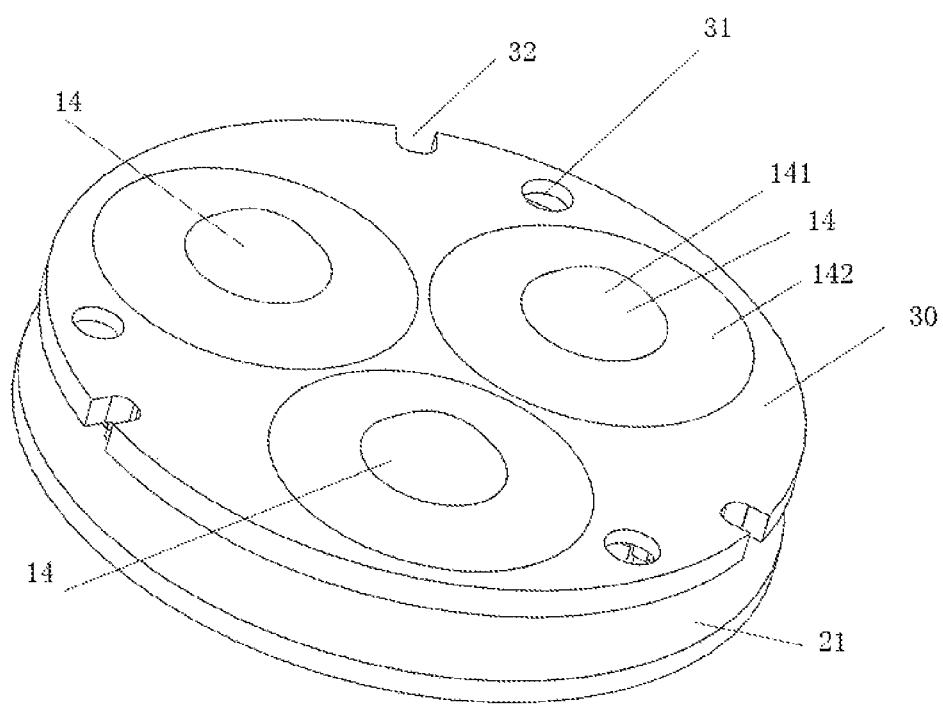
FIG. 4 is an assembly diagram of a light distribution assembly and the light-emitting assembly according to Example 1 of the present disclosure.

The main light-emitting surface 141 and the auxiliary light-emitting surface 142 protrude toward a side away from the light incident portion 11, the protruding height of the auxiliary light-emitting surface 142 gradually decreases in a direction away from the main light-emitting surface 141. The structure of the main light-emitting surface 141 and the auxiliary light-emitting surface 142 enables the light emitted from the light-emitting portion 14 to be more concentrated. The auxiliary light-emitting surface 142 is a curved surface, which helps to further concentrate the emergent light 223. As shown in FIG. 4, the auxiliary light-emitting surface 142 has a ring structure, which enables the entire lens 10 to be more beautiful and also enables the light-emitting portion 14 to have larger area.

The light incident portion 11 and the light-emitting portion 14 are arranged opposite to each other, and the light incident portion 11 faces the lamp body 22 of the light-emitting assembly 20. The light incident portion 11 includes a main light incident surface 111, and the main light incident surface 111 protrudes toward a side away from the light-emitting portion 14. The light incident portion 11 includes the main light incident surface 111 and auxiliary light incident surfaces, and convex portions 16 are provided around the main light incident surface 111, the convex portions 16 protrude toward the side away from the light-emitting portion 14, or the convex portions 16 protrude toward the lamp body 22 of the light-emitting assembly 20, and surfaces of the convex portions 16 facing the main light incident surface 111 are the auxiliary light incident surfaces, or surfaces of the convex portions 16 facing the lamp body 22 are the auxiliary light incident surfaces, surfaces of the convex portions 16 away from the main light incident surface 111 are reflective surfaces 13, or surfaces of the convex portions 16 away from the lamp body 22 are reflective surfaces 13. Angles are formed between the auxiliary light incident surfaces and the reflective surfaces 13. As shown in FIG. 2, both the auxiliary light incident surfaces and the reflective surfaces 13 are inclined surfaces, the thickness of the convex portions 16 gradually decreases in a direction toward the light-emitting assembly 20, that is, the distance between the auxiliary light incident surfaces and the reflective surfaces 13 gradually decreases in the direction toward the light-emitting assembly 20.

As shown in FIG. 3, a part of the incident light 222 emitted by the lamp body 22 of the light-emitting assembly 20 enters the lens 10 from the main light incident surface 111, and another part of the incident light 222 enters the lens 10 from the auxiliary light incident surfaces. A part of the light entering the lens directly exits from the main light-emitting surface 141 and the auxiliary light-emitting surface 142, and another part of the light exits from the main light-emitting surface 141 and the auxiliary light-emitting surfaces 142 after being totally reflected by the reflective surfaces 13.

At least two convex portions 16 are provided, and the protruding heights of the at least two convex portions 16 increase sequentially in the direction away from the main light incident surface 111, so that the auxiliary light incident surfaces can more fully receive the light emitted by lamp body 22 of the light-emitting assembly 20, and the light distribution effect is improved. The convex portions 16 preferably have a ring structure. The height of the convex portion 16 furthest from the main light incident surface 111 is higher than the height of the main light incident surface 111, which is beneficial for the auxiliary light incident surfaces to more fully receive the light emitted by the lamp body 22 of the light-emitting assembly 20.

As shown in FIG. 2, preferably, at least three convex portions 16 are provided, and the three convex portions 16 sequentially are the first convex portion 161, the second convex portion 162, and the third convex portion 163 in a direction away from the main light incident surface 111. A surface of the first convex portion 161 facing the lamp body 22 is the first auxiliary light incident surface 112, a surface of the second convex portion 162 facing the lamp body 22 is the second auxiliary light incident surface 113, and a surface of the third convex portion 163 facing the lamp body 22 is the third auxiliary light incident surface 114. A surface of the first convex portion 161 away from the lamp body 22 is the first reflective surface 131, a surface of the second convex portion 162 away from the lamp body 22 is the second reflective surface 132, and a surface of the third convex portion 163 away from the lamp body 22 is the third reflective surface.

Refer to FIG. 1 and FIG. 2, the protruding height of the third convex portion 163 is the largest, the protruding height of the third convex portion 163 is higher than the main light incident surface 111. Among the three convex portions, the outer end of the third convex portion 163 is closest to the light plate 21 of the light-emitting assembly 20, the outer end of the first convex portion 161 is farthest from the light plate 21, the distance between the outer end of the second convex portion 162 and the light plate 21 is between the distance between the outer end of the first convex portion 161 and the light plate 21 and the distance between the outer end of the third convex portion 163 and the light plate 21.

Example 2

Figure 6:
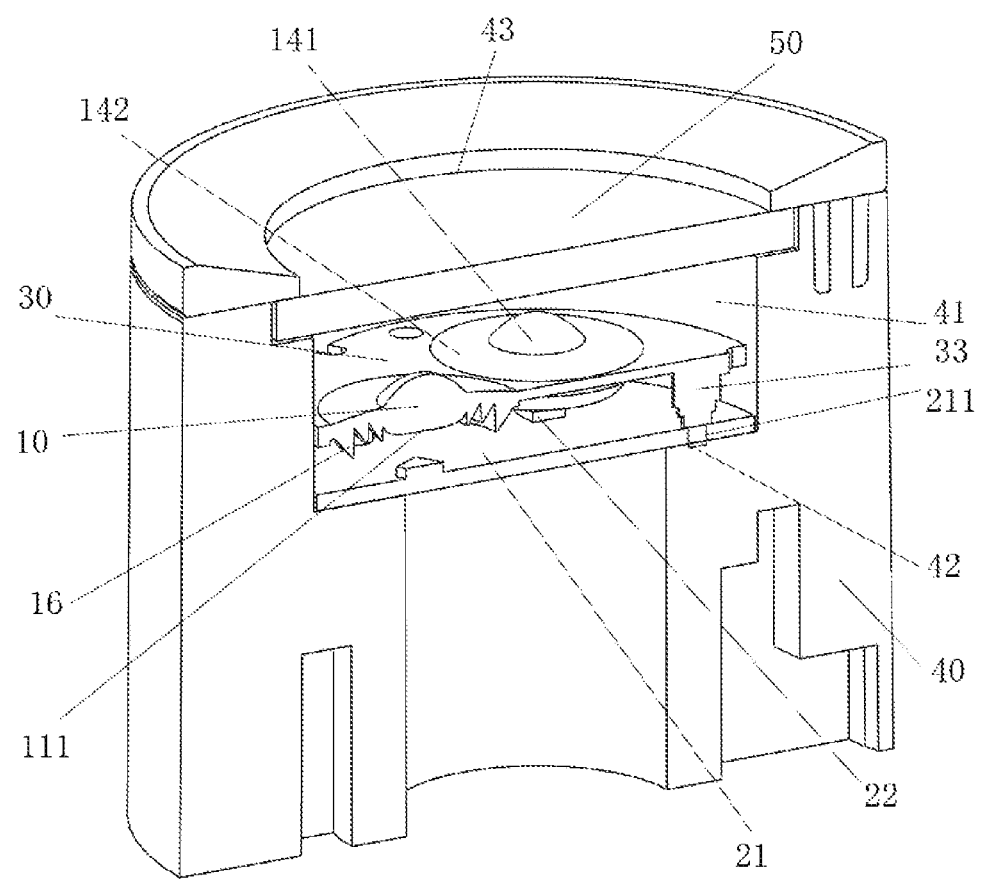
FIG. 6 is an internal schematic diagram of the lighting fixture according to Example 2 of the present disclosure.

As shown in FIG. 6, the example discloses a lighting fixture, which may be a downlight, the downlight includes a lamp housing 40, and the lamp housing 40 has a lamp cavity 41, the downlight also includes a light-emitting assembly 20, a light distribution assembly, and a power source, and the light-emitting assembly 20, the light distribution assembly, and the power source (not shown in the figure) are all arranged in the lamp cavity 41. The light-emitting assembly 20 is electrically connected to the power source, and the power source is electrically connected to an external power source through a threading hole on the lamp housing 40. The power source may not be provided in the lamp cavity 41, in another example, the power source is provided outside the lamp cavity 41.

As shown in FIG. 4, the light distribution assembly includes an installation plate 30 and the lens 10 of Example 1 distributed on the installation plate 30. One, two, three, four, or more lenses 10 may be provided, and the lenses 10 and the installation plate 30 can be integrally injection molded, the molding process is simple, and no assembly is required. As shown in FIG. 6, the installation plate 30 includes a first surface facing the light-emitting assembly 20 and a second surface away from the light-emitting assembly 20. The main light incident surface 111 of the lens 10 and the convex portion 16 of the lens 10 are exposed outside the first surface and face the light-emitting assembly 20. The light-emitting portion 14 of the lens 10 is exposed outside the second surface.

In the following, the lighting fixture of this example will be described with an example in which three lenses 10 are provided. The three lenses are circumferentially distributed on the installation plate 30. The light-emitting assembly 20 includes the light plate 21 and the lamp bodies 22 distributed on the light plate 21, and the light-emitting assembly 20 includes at least three groups of lamp bodies 22, each group of lamp bodies 22 is arranged opposite to a lens 10. The amount of the lamp bodies 22 included in each group of lamp bodies 22 may be provided as required, and the amount of the lamp bodies 22 included in each group of lamp bodies 22 may be one, in this case, the light-emitting center of this one lamp body 22 is the light-emitting center of the light-emitting assembly 20. In the case that each group of lamp bodies 22 includes at least two lamp bodies 22, the light-emitting center of the group of lamp bodies 22 is the light-emitting center of the light-emitting assembly 20.

The installation plate 30 is provided with a step shaft 33 on the surface facing the light plate 21, and the step shaft 33 may be integrally injection molded with the installation plate 30, the molding process is simple, and no assembly is required. The step shaft 33 includes at least three shaft sections, and the interface of adjacent shaft sections is a restrictive surface. At least two restrictive surfaces are provided on the step shaft 33. Preferably, the step shaft 33 includes four shaft segments to form three restrictive surfaces. In the following, the lighting fixture of this example will be described with an example in which four shaft sections of the step shaft 33 are provided.

The diameters of the four shaft sections become larger in sequence in the direction away from the light plate 21, the areas of the three restrictive surfaces become larger in sequence. Correspondingly, at least one group of restrictive holes 211 is distributed on the light plate 21, the amount of groups of the restrictive holes 211 is the same as the amount of the step shafts 33, and three groups of the restrictive holes 211 and three step shafts 33 may be provided. The connection lines of distribution points of the three step shafts 33 form a triangle, so that the installation plate 30 is reliably supported on the light plate 21. The amount of restrictive holes 211 in each group is the same as that of restrictive surfaces, both of them are three.

Different step shafts are fitted with different restrictive holes in a plug-in manner, and different restrictive surfaces are restrictively fitted with different restrictive holes. The distance between the installation plate 30 of the lighting fixture and the light plate 21 of the lighting fixture in this example is adjustable, so that the purpose of adjusting the beam angle can be achieved. The beam angle may be 12°, 24°, and 36°. The user can adjust the distance between the installation plate 30 and the light plate 21 as needed, and then the beam angle can be adjusted.

The installation plate 30 and the light plate 21 are arranged in parallel, and the beam angles of the lenses 10 can be changed by changing the distance between the installation plate 30 and the light plate 21. The distance between the installation plate 30 and the light plate 21 is set according to the size of the light-emitting surface of the lamp body 22. Specifically, the length of the shaft sections of the step shaft 33 are set according to the size of the light-emitting surface of the lamp body 22, so that after different restrictive surfaces are fitted with different restrictive holes 211, the beam angle can be 12°, 24°, and 36°.

In the process of adjusting the beam angle, firstly, the installation plate 30 is separated from the light plate 21, and then the installation plate 30 is rotated relative to the light plate 21, and finally the step shaft 33 is fitted with another restrictive hole 211 in the plug-in manner, the another restrictive hole 211 is restrictively fitted with another restrictive surface. The installation plate 30 is preferably a disc-shaped structure, correspondingly, the light plate 21 is also a disc-shaped structure. The center line of the installation plate 30 coincides with the center line of the light plate 21, the advantage is that: during the rotation of the installation plate 30, the installation plate 30 and the light plate 21 are always aligned in the length direction of the lamp housing 40, and the size in a horizontal direction will not be increased due to the relative rotation of the installation plate 30 and the light plate 21, so there is no need to increase the horizontal size of the lamp cavity 41, which is beneficial to save the volume of the lamp cavity 41. The horizontal direction here refers to the direction perpendicular to the center line of the installation plate 30 or the center line of the light plate 21.

The structure of the light-emitting portion 14 of the lighting fixture of this example enables the emergent light 223 to be more concentrated, and the beam angle according to this example is adjustable.

As shown in FIG. 4, the installation plate 30 is provided with connection holes 31, correspondingly, threaded holes are provided on the light plate 21, and the installation plate 30 and the light plate 21 are detachably connected together by screws. The installation plate 30 is provided with positioning grooves 32, and the positioning grooves 32 are provided on the edge of the installation plate 30, the positioning grooves 32 are fitted with positioning blocks on the inner surface of the lamp housing 40 in a plug-in manner, so that the installation plate 30 and the light plate 21 are positioned in the lamp cavity 41, and cannot be rotated.

The inner surface of the lamp housing 40 is provided with a supporting portion 42 for supporting the light plate 21 and fixing the positions of the light-emitting assembly 20 and the light distribution assembly in the length direction of the lamp housing 40. The lamp housing 40 has a light outlet 43, the light-emitting portions 14 of the lenses 10 face the light outlet 43, and the light outlet 43 is equipped with a transparent cover 50 that blocks the light outlet 43, and the transparent cover 50 plays roles of dustproof and waterproof.

Figure 5:
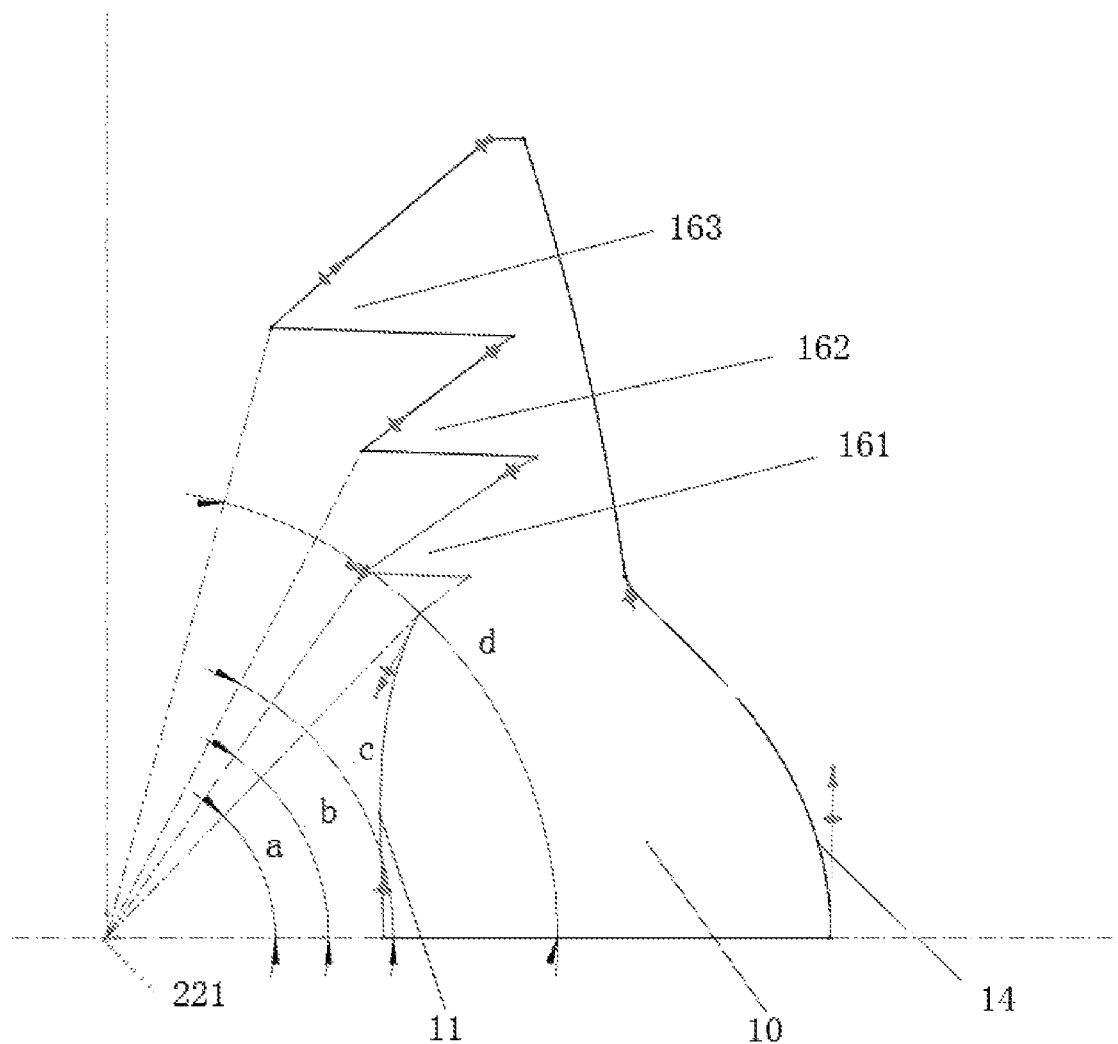
FIG. 5 is a schematic diagram of a part of the structure of the lens according to Example 1 of the present disclosure.

The light-emitting center of the lamp body 22 is the light-emitting center 221. As shown in FIG. 5, in order to improve the light output efficiency of the lens 10, an angle a is formed between the center line of the lens 10 and the line connecting the outer end of the main light incident surface 111 to the light-emitting center 221, and the angle a is 40°-50°, for example, the angle a may be 46°. An angle b is formed between the center line of the lens 10 and the line connecting the outer end of the first convex portion 161 to the light-emitting center 221, and the angle b is 50°-60°, for example, the angle b may be 54.9°. An angle c is formed between the center line of the lens 10 and the line connecting the outer end of the second convex portion 162 to the light-emitting center 221, and the angle c is 60°-70°, for example, the angle c may be 62.3°. An angle d is formed between the center line of the lens 10 and the line connecting the outer end of the third convex portion 163 to the light-emitting center 221, and the angle d is 70°-80°, for example, the angle d may be 74.9°.

The present disclosure provides a lens and lighting fixture with more focusing light beams.

A lens may include: a light incident portion and a light-emitting portion, the light-emitting portion comprises a main light-emitting surface and an auxiliary light-emitting surface surrounding the main light-emitting surface; the main light-emitting surface and the auxiliary light-emitting surface protrude toward a side away from the light incident portion, the auxiliary light-emitting surface is a curved surface; and the auxiliary light-emitting surface has a protruding height gradually decreasing in a direction away from the main light-emitting surface.

Preferably, in the lens, the lens is a collimating lens.

Preferably, in the lens, the light incident portion comprises a main light incident surface, and the main light incident surface protrudes toward a side away from the light-emitting portion.

Preferably, in the lens, the light incident portion comprises a main light incident surface and an auxiliary light incident surface, and a convex portion is provided around the main light incident surface, the convex portion protrudes toward the side away from the light-emitting portion, and a surface of the convex portion facing the main light incident surface forms the auxiliary light incident surface, and a surface of the convex portion away from the main light incident surface forms a reflective surface, and the reflective surface is a total reflective surface.

Preferably, in the lens, at least two convex portions are provided, and the at least two convex portions have heights increasing sequentially in a direction away from the main light incident surface.

A lighting fixture may include: a lamp housing, a light-emitting assembly, and a light distribution assembly, the light distribution assembly comprises the lens, the lamp housing has a lamp cavity, and the light-emitting assembly and the light distribution assembly are arranged in the lamp cavity.

Preferably, in the lighting fixture, the light distribution assembly further comprises a installation plate, the lens is arranged on the installation plate, and the installation plate is provided with a step shaft; the step shaft has at least three shaft sections, and an interface of every two adjacent shaft sections among the three shaft sections forms a restrictive surface; the light-emitting assembly comprises a light plate, the light plate is provided with at least two restrictive holes with different apertures, the step shaft is fitted with the restrictive holes in a plug-in manner, and the restrictive holes are restrictively fitted with the restrictive surfaces.

Preferably, in the lighting fixture, the installation plate and the light plate are both disc-shaped structures, and a center line of the installation plate coincides with a center line of the light plate.

Preferably, in the lighting fixture, different restrictive holes are restrictively fitted with different restrictive surfaces so that the lens forms different beam angles, and the beam angles comprise at least any two of 12°, 24°, and 36°.

Preferably, in the lighting fixture, the light incident portion comprises a main light incident surface and auxiliary light incident surfaces, and at least two convex portions are provided around the main light incident surface, the convex portions protrude toward the side away from the light-emitting portion, and surfaces of the convex portions facing the main light incident surface form the auxiliary light incident surfaces, and surfaces of the convex portions away from the main light incident surface form reflective surfaces, angles between a center line of the lens and connection lines connecting outer ends of the at least two convex portions to a light-emitting center of the light-emitting assembly increases sequentially in the direction away from the main light incident surface.

Preferably, in the lighting fixture, the at least two of the convex portions comprise a first convex portion, a second convex portion, and a third convex portion that are sequentially arranged from proximal position to distal position with respect to the main light incident surface, an angle between the center line of the lens and a connection line connecting an outer end of the first convex portion to the light-emitting center of the light-emitting assembly, an angle between the center line of the lens and a connection line connecting an outer end of the second convex portion to the light-emitting center of the light-emitting assembly, and an angle between the center line of the lens and a connection line connecting an outer end of the third convex portion to the light-emitting center of the light-emitting assembly are respectively 50°-60°, 60°-70°, and 70°-80°.

Preferably, in the lighting fixture, an angle between the center line of the lens and a connection line connecting an outer end of the main light incident surface to the light-emitting center of the light-emitting assembly is 40°-50°.

The above examples of the present disclosure focus on the differences between the various examples, and as long as the different optimized features between the various examples are not contradictory, they can be combined to form a better example. For succinct writing, they won't be repeated herein.

The above examples are only examples of the present disclosure, and do not impose any limitation on the present disclosure. For those skilled in the art, the present disclosure can have various modifications and changes. Any modification, equivalent replacement, improvement, and the like. made within the spirit and principle of the present disclosure shall be included in the scope of the present disclosure.

What is claimed is:

1. A lens comprising:
   a light incident portion and a light-emitting portion, wherein:
   the light-emitting portion comprises a main light-emitting surface and an auxiliary light-emitting surface surrounding the main light-emitting surface;
   the main light-emitting surface and the auxiliary light-emitting surface protrude toward a side away from the light incident portion,
   the main light-emitting surface is a curved surface, the auxiliary light-emitting surface is a curved surface, and a first radius of curvature of the main light-emitting surface is smaller than a second radius of curvature of the auxiliary light-emitting surface;
   the auxiliary light-emitting surface has a protruding height gradually decreasing in a direction away from the main light-emitting surface;
   the light incident portion comprises a main light incident surface and an auxiliary light incident surface, and the auxiliary light incident surface comprises three auxiliary light incident surfaces, wherein at least two convex portions are provided around the main light incident surface, the at least two convex portions have heights increasing sequentially in a direction away from the main light incident surface, and a height of the convex portion furthest from the main light incident surface is higher than a height of the main light incident surface.

2. The lens according to claim 1, wherein the lens is a collimating lens.

3. The lens according to claim 1, wherein the light incident portion comprises a main light incident surface, and the main light incident surface protrudes toward a side away from the light-emitting portion.

4. The lens according to claim 1, wherein the convex portions protrude toward the side away from the light-emitting portion, and a surface of the convex portions facing the main light incident surface forms the auxiliary light incident surface, and a surface of the convex portions away from the main light incident surface forms a reflective surface, and the reflective surface is a total reflective surface.

5. A lighting fixture, comprising:
a lamp housing, a light-emitting assembly and a light distribution assembly, wherein the light distribution assembly comprises a lens comprising a light incident portion and a light-emitting portion, wherein:
the light-emitting portion comprises a main light-emitting surface and an auxiliary light-emitting surface surrounding the main light-emitting surface;
the main light-emitting surface and the auxiliary light-emitting surface protrude toward a side away from the light incident portion,
the main light-emitting surface is a curved surface, the auxiliary light-emitting surface is a curved surface, and a first radius of curvature of the main light-emitting surface is smaller than a second radius of curvature of the auxiliary light-emitting surface;
the auxiliary light-emitting surface has a protruding height gradually decreasing in a direction away from the main light-emitting surface; and
the light incident portion comprises a main light incident surface and an auxiliary light incident surface, and the auxiliary light incident surface comprises three auxiliary light incident surfaces; and wherein:
the lamp housing has a lamp cavity, and the light-emitting assembly and the light distribution assembly are arranged in the lamp cavity, wherein at least two convex portions are provided around the main light incident surface, the at least two convex portions have heights increasing sequentially in a direction away from the main light incident surface, and a height of the convex portion furthest from the main light incident surface is higher than a height of the main light incident surface.

6. The lighting fixture according to claim 5, wherein:
the light distribution assembly further comprises an installation plate, the lens is arranged on the installation plate, and the installation plate is provided with a step shaft;
the step shaft has at least three shaft sections, and an interface of every two adjacent shaft sections among the three shaft sections forms a restrictive surface; and
the light-emitting assembly comprises a light plate, the light plate is provided with at least two restrictive holes with different apertures, the step shaft is fitted with the restrictive holes in a plug-in manner, and the restrictive holes are restrictively fitted with the restrictive surfaces.

7. The lighting fixture according to claim 6, wherein the installation plate and the light plate are both disc-shaped structures, and a center line of the installation plate coincides with a center line of the light plate.

8. The lighting fixture according to claim 6, wherein different restrictive holes are fitted with different restrictive surfaces so that the lens forms different beam angles, and the beam angles comprise at least any two of 12°, 24°, and 36°.

9. The lighting fixture according to claim 5, wherein the convex portions protrude toward the side away from the light-emitting portion, and surfaces of the convex portions facing the main light incident surface form the auxiliary light incident surfaces, and surfaces of the convex portions away from the main light incident surface form reflective surfaces, angles between a center line of the lens and connection lines connecting outer ends of the at least two convex portions to a light-emitting center of the light-emitting assembly increases sequentially in the direction away from the main light incident surface.

10. The lighting fixture according to claim 9, wherein the at least two of the convex portions comprise a first convex portion, a second convex portion, and a third convex portion that are sequentially arranged from proximal position to distal position with respect to the main light incident surface, an angle between the center line of the lens and a connection line connecting an outer end of the first convex portion to the light-emitting center of the light-emitting assembly, an angle between the center line of the lens and a connection line connecting an outer end of the second convex portion to the light-emitting center of the light-emitting assembly, and an angle between the center line of the lens and a connection line connecting an outer end of the third convex portion to the light-emitting center of the light-emitting assembly are respectively 50°-60°, 60°-70°, and 70°-80°.

11. The lighting fixture according to claim 9, wherein an angle between the center line of the lens and a connection line connecting an outer end of the main light incident surface to the light-emitting center of the light-emitting assembly is 40°-50°.

* * * * *